B. A. LEWIS.
Watch-Keys.

No. 133,945. Patented Dec. 17, 1872.

Witnesses.
Wm. A. Terry
Henry D. Cook

Inventor.
Burdette A. Lewis
By James Shepard, Atty.

UNITED STATES PATENT OFFICE.

BURDETTE A. LEWIS, OF PLAINVILLE, CONNECTICUT, ASSIGNOR TO ALLISON N. CLARK, OF SAME PLACE.

IMPROVEMENT IN WATCH-KEYS.

Specification forming part of Letters Patent No. 133,945, dated December 17, 1872.

*To all whom it may concern:*

Be it known that I, BURDETTE A. LEWIS, of Plainville, in the county of Hartford and State of Connecticut, have invented certain Improvements in Watch-Keys, of which the following is a specification.

My invention consists in a new article of manufacture, to wit: A watch-key in which the stem is provided with a knurled head arranged to revolve within a swivel-link, as hereafter described.

Figure 1:
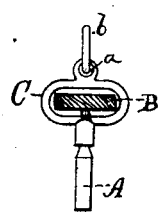
Figure 2:
Figure 3:
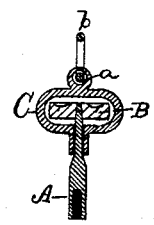

In the accompanying drawing, Figure 1 is a side elevation of a watch-key which embodies my invention; Fig. 2 is a top view of the same; and Fig. 3 is a vertical section of the same on line $x\,x$ of Fig. 2.

I construct this key of three parts, viz: The stem or key proper, A, its knurled head B, and a swivel-link, C. The link C is provided with a small eye, $a$, through which a ring, $b$, or a watch-chain may be secured. The lower end of the stem A has a square socket like all other watch-keys, and its upper end is reduced in size, as shown in the drawing, while at the extreme end it is a little tapering. The head B is a round disk with its edges serrated or knurled and its central hole slightly tapered.

After obtaining or making the parts, as shown and described, I pass the upper end of the stem A through the eye in the hub of the swivel-link C, and then place the head B inside of said link, when the tapering end of the shaft or stem A is driven into the central hole in the head B sufficiently tight to hold it therein, so that turning the head B will also turn the stem A.

I claim as my invention, as a new article of manufacture—

A watch-key consisting of the stem A, the disk-shaped knurled head B, arranged to revolve within the swivel-link C, substantially as described.

BURDETTE A. LEWIS.

Witnesses:
WM. GRAHAM,
HIRAM CARTER.